US008009772B1

(12) United States Patent
Ormesher et al.

(10) Patent No.: US 8,009,772 B1
(45) Date of Patent: Aug. 30, 2011

(54) CONCURRENT SIGNAL COMBINING AND CHANNEL ESTIMATION IN DIGITAL COMMUNICATIONS

(75) Inventors: Richard C. Ormesher, Albuquerque, NM (US); John J. Mason, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 641 days.

(21) Appl. No.: 11/564,396

(22) Filed: Nov. 29, 2006

Related U.S. Application Data

(63) Continuation-in-part of application No. 10/982,134, filed on Nov. 4, 2004.

(51) Int. Cl.
*H04L 27/06* (2006.01)
(52) U.S. Cl. ..................... 375/341; 714/795
(58) Field of Classification Search .......... 375/262, 375/265, 267, 340, 341, 347; 714/794, 795
See application file for complete search history.

(56) References Cited

U.S. PATENT DOCUMENTS

| | | | |
|---|---|---|---|
| 6,697,441 B1 | 2/2004 | Bottomley | |
| 6,721,366 B1* | 4/2004 | Van Stralen | 375/262 |
| 6,934,317 B1 | 8/2005 | Dent | |
| 6,983,008 B2 | 1/2006 | Mesecher | |
| 6,985,515 B2 | 1/2006 | Mesecher | |
| 2002/0193146 A1* | 12/2002 | Wallace et al. | 455/562 |
| 2005/0018793 A1* | 1/2005 | Learned | 375/340 |

OTHER PUBLICATIONS

S. M. Alamouti, "A Simple Transmit Diversity Technique for Wireless Communications," IEEE Journal on Selected Areas in Communications, vol. 16, pp. 1451-1458 , Oct. 1998.
Joachim Hagenauer, Elke Offer, and Lutz Papke, "Iterative Decoding of Binary Block and Convolutional Codes," IEEE Transactions on Information Theory, vol. 42, No. 2, pp . 429-445 , Mar. 1996.
Jan Bajcsy, et al, "On Iterative Decoding in Some Existing Systems," IEEE Journal on Selected Areas in Communications, vol. 19, No. 5, May 2001.
Rick S. Blum, et al, "Improved Space-Time Coding for MIMO-OFDM Wireless Communications," IEEE Transactions on Communications, vol. 49, No. 11, pp. 1873-1878, Nov. 2001.
L. Hanza, T. H. Liew, and B. L. Yeap, *Turbo Coding, Turbo Equalization and Space-Time Coding for Transmission over Fading Channels*, IEEE Press, pp. 395-398, 2002.
Ormesher and Mason, "A New Turbo Decoding Algorithm with Joint Time and Phase Estimation", IEEE Military Communications Conference, 2004.

* cited by examiner

*Primary Examiner* — Young T. Tse
(74) *Attorney, Agent, or Firm* — Madelynne J. Farber

(57) ABSTRACT

In the reception of digital information transmitted on a communication channel, a characteristic exhibited by the communication channel during transmission of the digital information is estimated based on a communication signal that represents the digital information and has been received via the communication channel. Concurrently with the estimating, the communication signal is used to decide what digital information was transmitted.

11 Claims, 16 Drawing Sheets

Multiplexer output:

rate 1/2: $m_i(k) = \{m_1(k), m_2(k)\} = u(1), p(1), u(2), q(2), u(3), p(3), u(4), q(4)\ldots$ rate 1/3: $m_i(k) = \{m_1(k), m_2(k), m_3(k)\} = u(1), p(1), q(1), u(2), p(2), q(2), u(3), p(3), q(3)\ldots$ $$\gamma(s_{k-1}, s_k) = \tilde{m}_1 \times \sum_{n=2kN_c}^{n=2kN_c+N_c-1} y(t_n) y_{ref}(t_n + \hat{\tau}_{s_{k-1}}) e^{-j\hat{\varphi}_{s_{k-1}}}$$

$$+ \tilde{m}_2 \times \sum_{n=2kN_c+N_c}^{n=2kN_c+2N_c-1} y(t_n) y_{ref}(t_n + \hat{\tau}_{s_{k-1}}) e^{-j\hat{\varphi}_{s_{k-1}}}$$

Eqn.(13)

FIG. 5

$$v_E(k,s_k) = \sum_{n=2kN_C}^{n=2kN_C+N_C-1} \hat{m}_1(k,s_k)y(t_n)e^{-j\hat{\varphi}_{s_k}}y_{ref}(t_n+\hat{\tau}_{s_k}+\delta)$$

$$+ \sum_{n=2kN_C+N_C}^{n=2kN_C+2N_C-1} \hat{m}_2(k,s_k)y(t_n)e^{-j\hat{\varphi}_{s_k}}y_{ref}(t_n+\hat{\tau}_{s_k}+\delta)$$

$$+ v_E(k,s_{k-1})$$

Eqn.(8)

FIG. 7

$$v_M(k,s_k) = \sum_{n=2kN_C}^{n=2kN_C+N_C-1} \hat{m}_1(k,s_k)y(t_n)e^{-j\hat{\varphi}_{s_k}}y_{ref}(t_n+\hat{\tau}_{s_k})$$

$$+ \sum_{n=2kN_C+N_C}^{n=2kN_C+2N_C-1} \hat{m}_2(k,s_k)y(t_n)e^{-j\hat{\varphi}_{s_k}}y_{ref}(t_n+\hat{\tau}_{s_k}) + v_M(k,s_{k-1})$$

Eqn.(9)

FIG. 8

$$v_L(k,s_k) = \sum_{n=2kN_c}^{n=2kN_c+N_c-1} \hat{m}_1(k,s_k) y(t_n) e^{-j\hat{\varphi}_{s_k}} y_{ref}(t_n + \hat{\tau}_{s_k} - \delta)$$

$$+ \sum_{n=2kN_c+N_c}^{n=2kN_c+2N_c-1} \hat{m}_2(k,s_k) y(t_n) e^{-j\hat{\varphi}_{s_k}} y_{ref}(t_n + \hat{\tau}_{s_k} - \delta) + v_L(k, s_{k-1})$$

Eqn.(10)

*FIG. 9*

$$\delta\hat{\varphi}_{s_k} = atan\left(\frac{imag(v_M(k,s_k))}{real(v_M(k,s_k))}\right)$$

Eqn.(11)

*FIG. 10*

CONCURRENT SIGNAL COMBINING AND CHANNEL ESTIMATION IN DIGITAL COMMUNICATIONS

This is a continuation-in-part of U.S. patent application Ser. No. 10/982,134 (SD-7376), entitled USING CONVULUTIONAL DECODING TO IMPROVE TIME DELAY AND PHASE ESTIMATION IN DIGITAL COMMUNICATIONS, which was filed on Nov. 4, 2004, and which is incorporated herein by reference.

This invention was developed under Contract DE-AC04-94AL85000 between Sandia Corporation and the U.S. Department of Energy. The U.S. Government has certain rights in this invention.

FIELD OF THE INVENTION

The invention relates generally to the reception of a digital communication signal and, more particularly, to the reception of a digital communication signal via a plurality of transmission channels that include wireless communication links.

BACKGROUND OF THE INVENTION

In conventional wireless communication systems, the channel capacity and reliability can be increased by using antenna diversity techniques, wherein multiple antennas are used to provide multiple channels that can mitigate Rayleigh fading effects. For example, multiple channel communications can be used in mobile communication systems, and in satellite communications systems where a single user transmits a signal through several satellite transponders to a common base-station. Several conventional approaches allow the signals received from multiple transmission paths (i.e., multiple channels) to be combined at the receiver. Some examples of these are: selection diversity, wherein the received channel with the largest signal-to-noise ratio is selected, and the remaining channels are discarded; equal gain combining, wherein the receiver independently estimates and removes channel parameters with respect to each received channel, and then equally combines the detected channel symbols; and maximum ratio combining (MRC), wherein the receiver independently estimates and removes channel parameters with respect to each received channel, and then combines the channel symbols proportionally by the strength of the signals received on the respective channels. In these and other conventional approaches, channel parameters such as phase and time delay are estimated before the received signals are combined.

FIG. 14 diagrammatically illustrates a Single Input Multiple Output (SIMO) wireless communications system according to the prior art. In the exemplary system of FIG. 14, typical of satellite communications systems that are used for both communications and user geo-location, a ground station receiver 140 cooperates with a common (i.e., single) transmitter, and several transponders shown generally at 141. The common transmitter transmits a signal to the transponders at 141, which in turn transmit the signal to the receiver 140. (For clarity and conciseness of exposition, the example of FIG. 14 shows only two transponders and their associated channels.) The receiver 140 includes two antennas that receive two respective versions of the transmitted information message, one associated with each channel. The receiver 140 also includes channel estimators that estimate unknown parameters associated with the channels, for example, unknown time delay parameters and unknown phase parameters. Compensators at 142 appropriately compensate for the estimated channel parameters. The estimation of channel parameters, and the associated compensation, is performed before the signals are combined at 143 and decoded at 144. In FIG. 14 (and in FIG. 15 described hereinbelow), the "h" characters represent characteristics of wireless communication links (between respective pairs of communicating antennas) in the respective transmission channels, and the "n" characters represent noise in the associated channels.

At low signal-to-noise ratios, the aforementioned unknown channel parameters can be difficult to estimate, which can adversely impact the aforementioned signal combing and decoding. It is therefore desirable to provide for improvements in wireless communications at low signal-to-noise ratios.

BRIEF DESCRIPTION OF THE DRAWINGS

FIG. 5 illustrates operations that can be performed by a transition metric determiner used by exemplary embodiments of the invention.

FIG. 7 illustrates operations that can be performed by an early correlator used by exemplary embodiments of the invention.

FIG. 8 illustrates operations that can be performed by a middle correlator used by exemplary embodiments of the invention.

FIG. 9 illustrates operations that can be performed by a late correlator used by exemplary embodiments of the invention.

FIG. 10 illustrates operations that can be performed by a phase processor used by exemplary embodiments of the invention.

DETAILED DESCRIPTION

Exemplary embodiments of the invention provide for combining signals in multi-channel wireless communication receivers such as may be used in, for example, mobile or satellite communication systems. Unknown channel parameters are estimated and removed while, concurrently, the signals are also combined to decode the substantive information that has been transmitted. This improves overall channel capacity. Examples of the aforementioned unknown channel parameters include an unknown time-varying time delay, also referred to herein as $\tau(t)$, and an unknown time-varying carrier phase, also referred to herein as $\phi(t)$.

Figure 15:
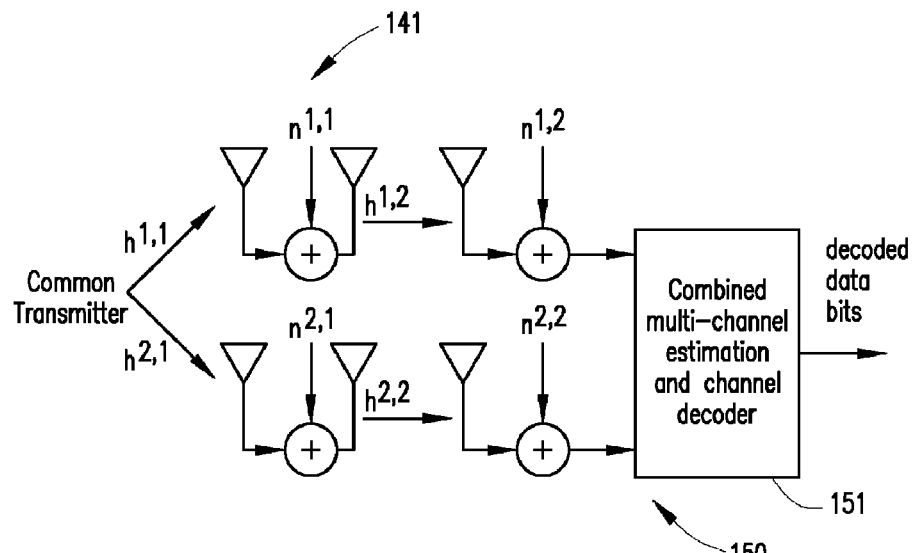
FIG. 15 diagrammatically illustrates a SIMO communications system according to exemplary embodiments of the invention.

A SIMO wireless communications system according to exemplary embodiments of the invention is illustrated diagrammatically in FIG. 15. (For clarity and conciseness of exposition, the example of FIG. 15 shows only two channels explicitly.) The receiver 150 of FIG. 15 includes an apparatus 151 that integrates and concurrently performs, for multiple signals respectively received on multiple channels, the following operations: channel parameter estimation; compensation for the estimated channel parameter(s); and combination of the signals to support decoding of the substantive information carried by the signals.

According to exemplary embodiments of the invention, the apparatus 151 utilizes structures and functionalities described in the aforementioned U.S. patent application Ser. No. 10/982,134. These structures and functionalities are described hereinbelow with reference to FIGS. 1-13.

In conventional digital communications receivers, a received message might consist of a preamble or acquisition sequence followed by a block of coded channel symbols that have been spread with a direct sequence spread spectrum (DSSS) code. The acquisition preamble's SNR is typically large enough to provide an estimate of the initial carrier frequency, phase, and symbol timing. The received signal typically has both symbol timing and carrier frequency drift, due to clock errors and relative motion between the receiver and transmitter.

$$y(t_n) = \sqrt{\frac{E_S}{T_S}} c_i(k, t_n - \tau(t_n))m_i(k)e^{j\varphi(t_n)} + n(t_n) \quad (1)$$

A sample at time $t_n$ of a DSSS binary phase-shift keyed (BPSK) communications signal transmitted over an additive white Gaussian noise channel has the following complex form where $E_s$ denotes the constant symbol energy, $c_i(k,t)$ is the bipolar spreading function of time t for the $k^{th}$ data bit, i is the symbol index for the $k^{th}$ data bit and consist of the values $\{1,2\}$ for a ½ rate code, or $\{1,2,3\}$ for a rate 1/3 code, for example. $T_s$ is the data symbol interval, $m_i(k)$ is the sequence of data symbols from the channel encoder output (see FIG. 1) and for BPSK modulation takes on values of ±1, $\tau(t)$ is an unknown time-varying time delay, $\phi(t)$ is an unknown time-varying carrier phase, $n(t)$ is zero mean complex Gaussian noise with variance $\sigma_n^2 = N_0/T_{ad}$, and n is the time sample index. The received signal is sampled such that $$t_n - t_{n-1} = T_{ad} \quad (2)$$

where $T_{ad}$ is the analog-to-digital converter sample interval.

Coherent PSK communications require that the transmitter and receiver waveforms be synchronized. As mentioned above, the received signal (1) contains both an unknown timing term, $\tau(t)$, and phase term, $\phi(t)$. These unknown terms are due to transmitter and receiver clock errors and RF channel dynamics. The receiver, therefore, needs to estimate and remove these unknown time and phase terms prior to despreading and detecting the channel symbols.

Figure 2:
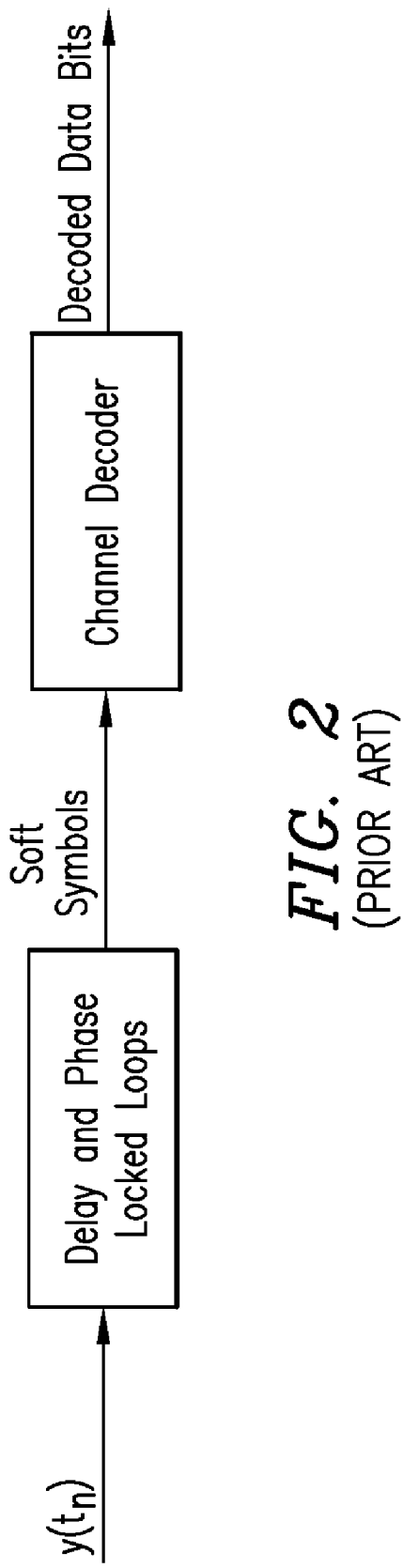
FIG. 2 diagrammatically illustrates delay lock loops and phase lock loops combined with channel decoders according to the prior art.

The conventional coherent demodulation approach, shown in FIG. 2, is to employ delay and phase locked loops (DPLL) to track and remove unknown phase and time terms prior to channel decoding.

Figure 3:
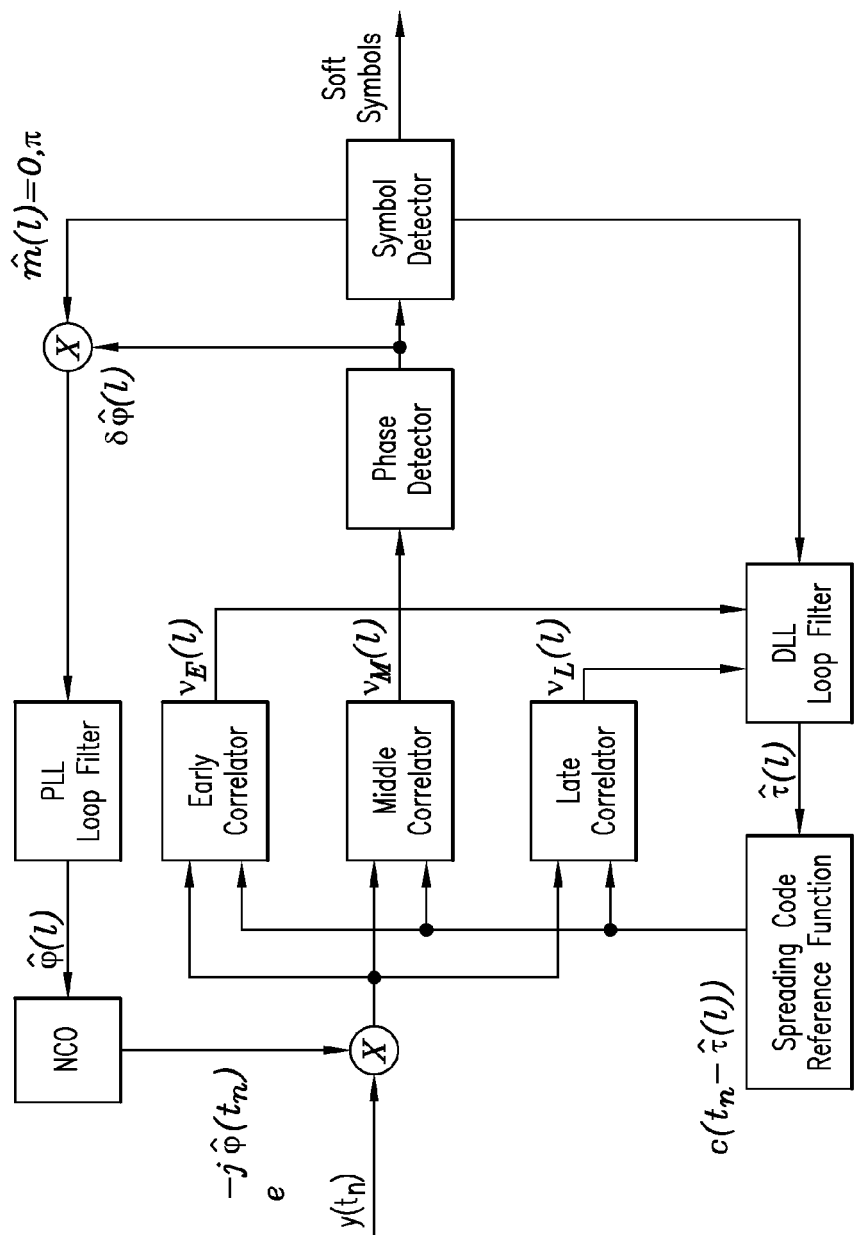
FIG. 3 diagrammatically illustrates delay and phase locked loops according to the prior art.

FIG. 3 is a block diagram for a conventional coherent data-aided Delay and Phase Locked Loop (DPLL). The input data stream, $y(t_n)$, is assumed to be a sampled complex signal defined by Eqn. (1). The time tracking and phase tracking loops are implemented in parallel. The DLL consists of a pair of early and late correlators to track bit timing and despread the DSSS modulation. The data-aided PLL is implemented digitally with a Numerically Controlled Oscillator (NCO) and hard-symbol detector. The PLL performs the carrier phase tracking required to remove the unknown phase term, $\phi(t_n)$. The output of the middle correlator is the complex value of the despread symbol and the phase of this term is corrected by 0 or $\pi$ radians according to the sign of the detected soft symbol (i.e., a data-aided loop). The phase corrected middle correlator output is fed into the loop filters. In FIG. 3 the parameter l indicates the index of a data symbol. Dropping the subscript on $m_i(k)$ indicates the alternate indexing scheme such that m(l)=m(k+i/R) for a rate R code. This symbol index illustrates how data symbols are processed in the conventional DPLL approach.

The equations for the correlators and phase detector of FIG. 3 are given as follows:

$$v_E(l) = \sum_{n=l\cdot N_c}^{n=l\cdot N_c+N_c-1} y_{ref}(t_n + \hat{\tau}(t_n) + \delta T_c)y(t_n)e^{-j\hat{\varphi}(t_n)} \quad (3)$$

$$v_M(l) = \sum_{n=l\cdot N_c}^{n=l\cdot N_c+N_c-1} y_{ref}(t_n + \hat{\tau}(t_n))y(t_n)e^{-j\hat{\varphi}(t_n)} \quad (4)$$

$$v_L(l) = \sum_{n=l\cdot N_c}^{n=l\cdot N_c+N_c-1} y_{ref}(t_n + \hat{\tau}(t_n) - \delta T_c)y(t_n)e^{-j\hat{\varphi}(t_n)} \quad (5)$$

$$\delta\hat{\varphi}(l) = \mathrm{atan}\, 2\left(\frac{imag\ (v_M(l))}{real\ (v_M(l))}\right) \quad (6)$$

$$\delta\hat{\tau}(l) = f(v_E(l) - v_L(l)) \quad (7)$$

where $y(t_n)$ is the sampled input signal; $y_{ref}$ is the reference signal used to despread the input signal, $v_E$, $v_M$, and $v_L$ are the integrate and dump outputs of the early, middle and late correlators, respectively; $\delta\hat{\varphi}(l)$ is the instantaneous phase estimate of the input signal and is obtained from the output of the middle correlator, $V_M$, $\hat{\varphi}(l)$ is the filtered phase estimate, $\delta\hat{\tau}(l)$ is the instantaneous time delay estimate of the input signal and is obtained from the output of the early and late correlators, $v_E$ and $v_L$, and $\hat{\tau}(l)$ is the filtered time delay estimate.

The performance of conventional coherent data-aided DPLLs such as described above is degraded when the symbol energy to noise power density ratio $E_s/N_o$ is low.

The present invention recognizes that Turbo codes can operate with very low symbol energy to noise power density ratios values ($E_s/N_0 < 0$ dB), and that DPLL performance will improve if the SNR at the correlator output is increased by removing the data modulation and coherently integrating over more than one symbol. The invention further recognizes that SNR can be increased by increasing the coherent integration time of the early, middle, and late correlators. However, the coherent integration interval cannot be increased without first removing the unknown data symbol modulation.

This problem can be addressed by integrating the DPLL into a convolutional decoder algorithm (e.g., a Viterbi algorithm), and using the estimated symbols from within the decoding process to remove a set of one or more unknown data symbols prior to the correlators (i.e., integrate and dump operation) used in the standard DPLL method.

This results in two improvements relative to the conventional DPLL approach. First, using the data symbol estimates from within the data decoder provides a better symbol estimator than the simple hard symbol detector used over a single data symbol as done in the conventional DPLL. By using the data symbol estimates from within the decoder, the information imparted on adjacent symbols by the channel encoder is exploited. This results in fewer phase modulation removal errors in the data-aided loop. Second, in contrast to the conventional DPLL, wherein only a single symbol is detected and removed at a time, so that the coherent integration time is limited to a single symbol, the aforementioned integrated DPLL architecture can estimate and integrate over several data symbols at a time (as explained below). This increases the coherent integration time and results in an increase in the effective signal to noise ratio at the output of the DPLL correlators. The end result is improved estimates of the instantaneous phase and time delay terms, which allows the DPLL to work at lower $E_s/N_0$ values.

Convolutionally encoded error control channel symbols in a phase-shift keyed (PSK) digital communications receiver can be jointly tracked and decoded. Either or both symbol time and phase estimation can be incorporated within a Viterbi decoding process. This approach is referred to herein as the Integrated Viterbi Algorithm (IVA). Making data decisions inside the Viterbi decoding process improves the performance of the time and phase tracking loops, compared to prior art methods which make time and phase corrections prior to the Viterbi decoding process. The correlations among adjacent convolutionally-encoded symbols can be exploited. Within the Viterbi decoder a PSK decision can be based not solely on the measured phase of the symbol in question, but also on the phases and decisions regarding all other symbols on the path selected during the Viterbi decoding process.

The IVA can be incorporated into a Turbo decoder resulting in a tracking Turbo decoder that can operate at lower signal-to-noise ratio (SNR) than that of a delay and phase locked loop (DLL/PLL) using the conventional approach. An IVA decoder and a conventional soft-output Viterbi algorithm (SOVA) decoder can be concatenated in parallel to implement an Integrated Turbo Algorithm (ITA). The IVA decoder estimates timing and/or phase, performs the PSK symbol detection, including despreading in some embodiments, and generates soft PSK symbol values for input to the parallel-concatenated conventional SOVA decoder. Thus, a Viterbi decoder with integrated (internal) delay and/or phase locked loops is provided, and can be used to make a Turbo decoder with integrated delay and phase tracking loops.

Figure 13:
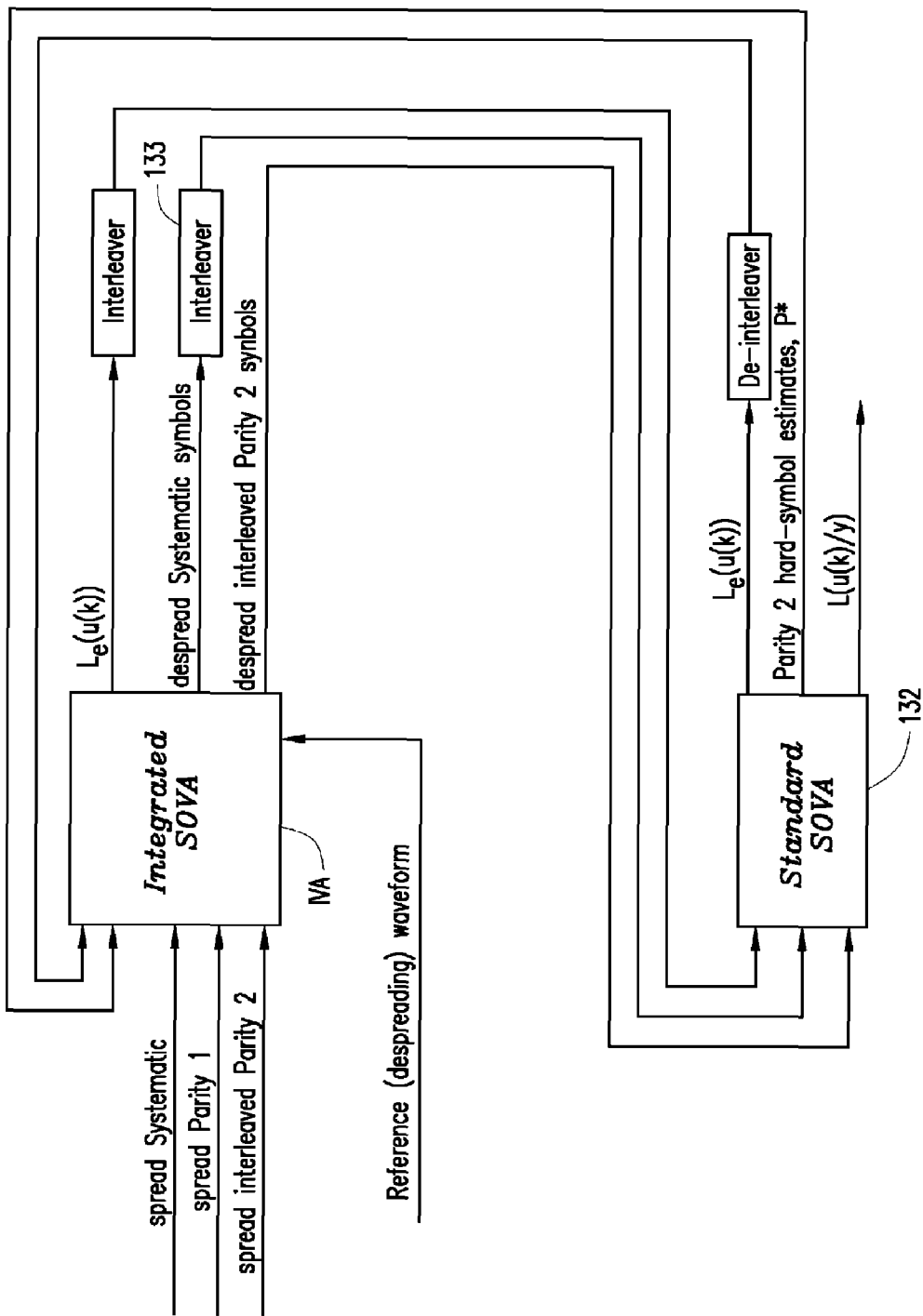
FIG. 13 diagrammatically illustrates pertinent portions of further exemplary embodiments of a digital communications receiver according to the invention.
Figure 14:
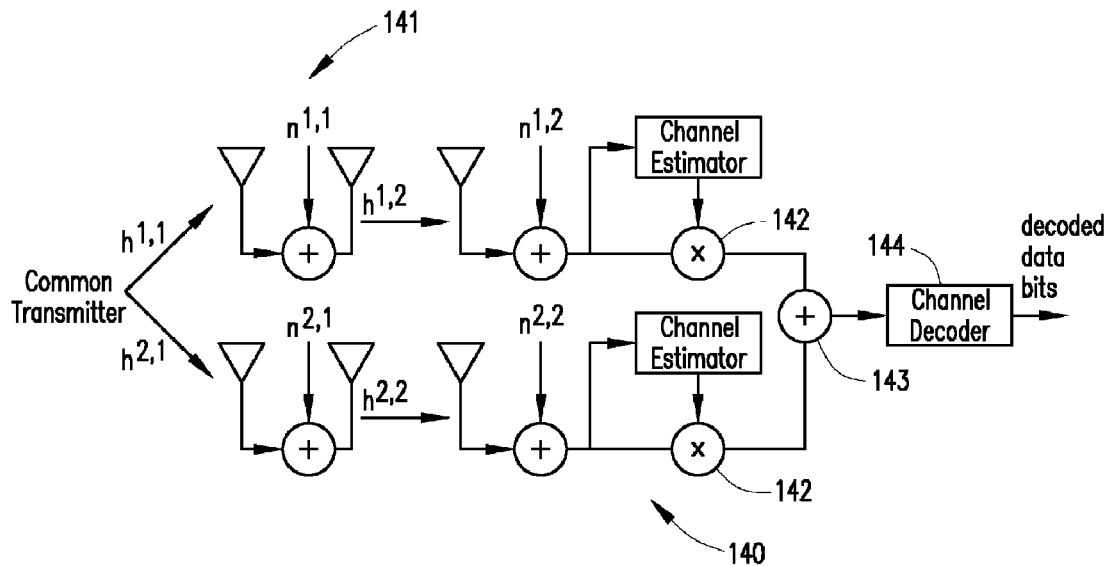
FIG. 14 diagrammatically illustrates a SIMO communications system according to the prior art.

A block diagram of an ITA decoder that simultaneously despreads channel symbols, decodes channel symbols, and tracks timing and phase is shown in FIG. 13. Two component decoders are linked together by an interleaver, a de-interleaver, and the a priori information is passed between them. The first component decoder of the ITA is the Integrated Viterbi Algorithm (IVA). In this IVA decoder, time and phase tracking are implemented simultaneously within a Soft Output Viterbi Algorithm (SOVA) decoding process. The input into the IVA is the sampled complex received signal defined in Eqn. (1). In this example, the input signal has had a spreading sequence applied thereto, and has unknown, time-varying phase and time-delay parameters. FIG. 13 shows the input signal partitioned into systematic and parity symbols. The operations required to despread the symbols and to estimate and remove the unknown time and/or phase terms are implemented as an integral operation within the IVA decoder.

A data-aided coherent Delay and Phase Lock Loop (DPLL) can be executed simultaneously during the Viterbi decoding process of the IVA decoder. Phase and time estimation can be performed with respect to the input signal, for example, a spread spectrum BPSK signal. The output of the IVA decoder is a set of despread soft symbols and the normal extrinsic information, $L_e(u_k)$, related to the information bit u (k) (see also FIG. 1). The despread soft symbols correspond to the set of soft symbols that would typically come from the output of a conventional DPLL preceding the channel decoder (see also FIGS. 2 and 3).

Figure 1:
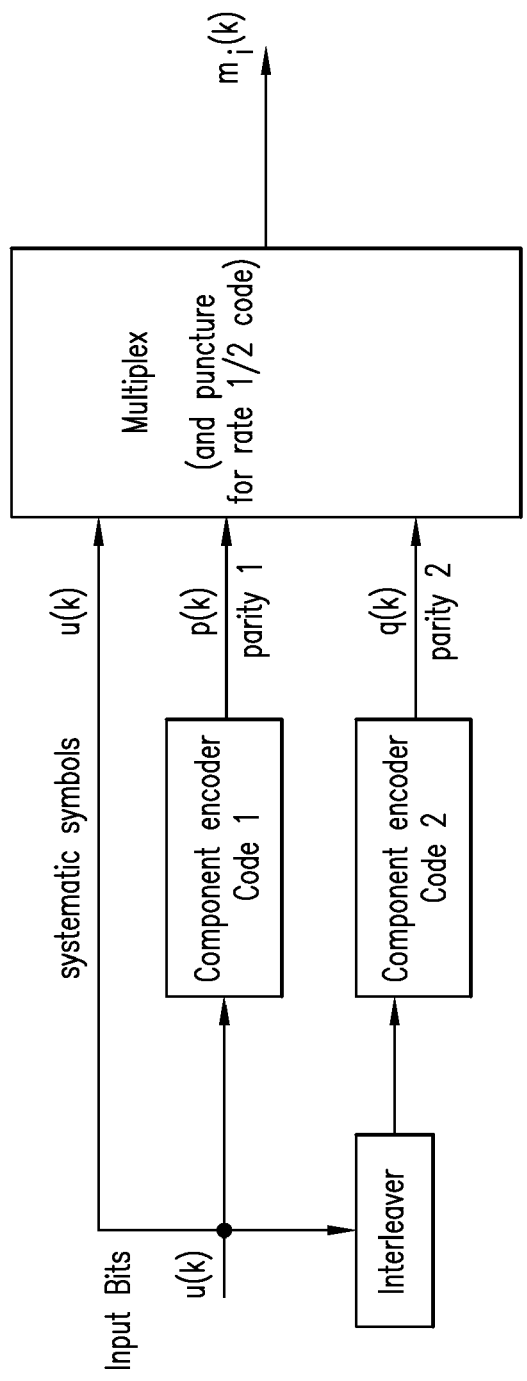
FIG. 1 diagrammatically illustrates a turbo channel encoder according to the prior art.

Because of the interleaving (see also FIG. 1), phase estimation, time estimation, and data despreading can only be implemented within the IVA decoder. This is because the systematic symbols that are input to the second component decoder 132 must be interleaved at 133 to account for the fact that the systematic symbols were interleaved before encoding and transmission of the Parity 2 information, as shown in FIG. 1. The interleaving at 133 scrambles the phase on the systematic symbols, making tracking impossible in decoder 132. The output from the decoder 132 includes the extrinsic information, $L_e(u_k)$, related to the information bit, u(k), the a posteriori Log-Likelihood Ratio (LLR) for the information bit, L(u(k)|y), and the hard-symbols estimates for the Parity 2 symbols. The hard detected Parity 2 symbols are used in the DPLL of the IVA decoder, as described in more detail below.

Figure 4:
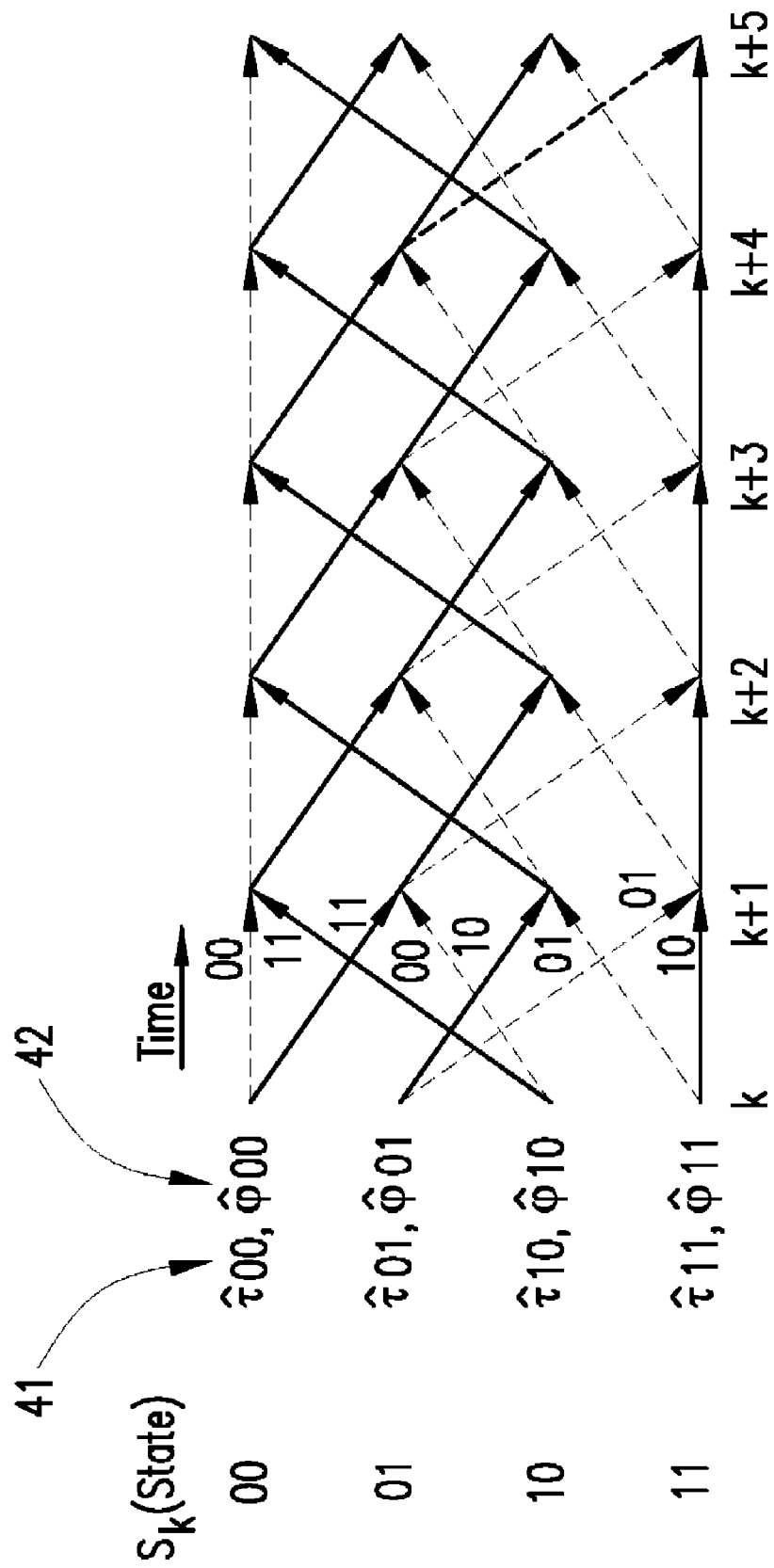
FIG. 4 is a trellis diagram for a ½ rate RSC code of constraint length three.

The IVA decoder can integrate a DLL and/or a PLL into the Viterbi Algorithm. The conventional Viterbi algorithm searches all possible paths in its associated trellis, and selects the codeword (i.e., encoder output) whose distance from the received symbol sequence is smallest among all possible codewords. The decoding algorithm starts at the first received symbol and continues until the last received symbol is processed. At each bit interval, the path is reduced by deselecting codewords from all the possible remaining codewords. At each interval for each state of the trellis, two paths merge into that single state, as shown in FIG. 4. The path with the smaller metric is eliminated as the optimal path, leaving a single surviving path for that state at that interval. When the end of the trellis is reached, there are four surviving paths, and the surviving path with the largest path metric is selected as the most likely path. At any bit interval within the decoding process there are $2^{k-1}$ possible surviving paths, where K is the constraint length of the encoder (K=3 in FIG. 4). Each of these paths has a unique associated codeword. These codewords are used to implement a data-aided loop. A separate DPLL can be implemented for each of these paths during the decoding process.

Consider the correlators defined by Eqn. (3) through Eqn. (5) above that are used to estimate instantaneous time delay, $\hat{\delta\tau}(l)$, and instantaneous phase, $\hat{\delta\phi}(l)$, of the $l^{th}$ symbol, m(l) within the conventional data-aided DPLL. The correlator signal outputs $V_E(l)$ and $V_L(l)$ are used in the delay computer to track and time align the input signal to a reference signal, while correlator output $V_m(l)$ is used to estimate the phase of the current symbol. In each case, the correlators use the detected hard-symbol $\hat{m}(l)$ to remove the data modulation before the symbol phase and time estimate are made (i.e., a data-aided loop). In the loop shown in FIG. 3, the hard-symbol detection occurs after the basic integrate and dump operation from the middle correlator.

As previously mentioned, according to exemplary embodiments of the invention, the effective SNR at the output of the correlators can be increased and the instantaneous estimates of both symbol time and phase can be improved, thereby improving the overall performance of the DPLL. From examination of Eqn. (3) through Eqn. (5), if the symbol values $\hat{m}(l)$ are known a priori, and if time and phase are constant over several symbols, then the correlators can integrate over several symbols before estimating time and phase. Define L as the number of bit intervals in which time and phase are considered constant enough to allow for coherent integration. Examples of L in various embodiments are 5, 10, 50, 100, etc. Then, for a ½ rate component code, at any bit interval in the Viterbi decoding process, there are a set of 2*L symbol estimates for each surviving path. These symbols can be used to remove data symbol modulation and increase the correlator integration interval in a data-aided DPLL. One of the surviving paths will eventually be selected as the most likely path.

Eqn. (8), Eqn. (9) and Eqn. (10) shown respectively in FIGS. 7, 8 and 9 define examples of early (FIG. 7), middle (FIG. 8) and late (FIG. 9) correlators that support coherent integration over a block of L Viterbi decisions for a ½ rate punctured code.

In Eqn. (8) to Eqn. (10) $s_k$ indicates the current state at the $k^{th}$ bit interval in the Viterbi decoding process, $s_{k-1}$ indicates the previous state for the selected path and $N_c$ is the number of PN code chips per data symbol. The parameter $\delta$ could be, for example, $\frac{1}{8}^{th}$ of a chip width. In the ½ rate decoder $\hat{m}_i(k,s_k)$ is the symbol estimate at the kth bit for state $s_k$ while i=1 for the systematic symbol and i=2 for the parity symbol. Notice, that for a ½ rate encoder, the correlators sum over two data symbols per decoding interval and will sum over a total of 2*L data symbols before they are dumped and phase and time estimates are updated. Also, notice that there is a unique DPLL implemented for each surviving path of the trellis. Eqn. (11) of FIG. 10 needs to use a two argument arctangent function whose range is $-\pi$ to $\pi$.

To illustrate the use of Eqn. (8) to Eqn. (10), assume that we are at the kth bit interval in the Integrated Viterbi Algorithm. Then, at each state, $s_k$, there is a surviving path (see also FIG. 4) and an associated Viterbi path metric. In addition, each surviving path has a time delay and phase estimate, $\hat{\tau}_{s_k}$ and $\hat{\phi}_{s_k}$, respectively. These are the time and phase terms that are estimated and tracked via the DPLL and are updated for each state every L bit intervals according to the invention. Each state therefore has associated therewith one or both of a phase estimate and a time delay estimate, and the estimates for each state are completed at the completion of each block of L bit intervals. At the beginning of the trellis processing, conventional techniques can be used to make an initial time delay estimate for all states (see FIG. 4) based on the message preamble. The initial phase estimates at the beginning of the trellis can be handled in similar fashion, estimating the phase for all states based on the preamble. The initial time delay and phase estimates for the various states are shown at 41 and 42 in FIG. 4.

For the correlators, the next 2*L data symbols are summed using the decision sequence $\hat{m}_i(k,s_k), \ldots, \hat{m}_i(k+L,s_{k+L})$ to remove the data modulation. Because we are in the middle of the Viterbi decoding process, there is a decision sequence from $s_k$ to $s_{k+L}$ for each survivor of state $s_{k+L}$ at the k+L bit.

The terms $v_E$, $v_M$, and $v_L$ are initialized to zero at the start of each block of 2*L symbols (L bit intervals), and the Viterbi decoding process and summing of the terms in Eqn. (8) to Eqn. (10) proceeds, for each state, over the selected path.

For example, at the next bit interval, k, for each state, $s_k$, exemplary embodiments of the invention perform the following steps S1-S3:

S1) Using the current time delay estimate, $\hat{\tau}_{s_{k-1}}$, and phase estimate, $\hat{\phi}_{s_{k-1}}$, Eqn. (13) of FIG. 5 is used to despread the sampled data symbol sequence and calculate transition metrics, $\gamma(s_{k-1}, s_k)$. In Eqn. (13) $\hat{m}_1$ and $\hat{m}_2$ are the codeword symbols associated with the branch transition from $s_{k-1}$ to $s_k$. Two transition metrics, corresponding to the two possible incoming path segments or branch transitions (see also FIG. 4), are calculated for each state at each bit interval k. The time delay and phase estimates (with subscripts k-1 in FIG. 5) used in a given transition metric calculation are those estimates currently associated with the state from which the transition (path segment) under consideration originates. For example, considering state 01 in FIG. 4, one transition metric would be calculated using the current time delay and phase estimates for state 00, and the other transition metric would be calculated using the current time delay and phase estimates for state 10. For the rate ½ (punctured) code, the parity symbol is not sent on even numbered bits, as shown in FIG. 1, so the second sum in Eqn. (13) is zero for every other bit period. For the rate ⅓ Turbo code, the parity bits are always sent so both sums are computed.

Figure 6:
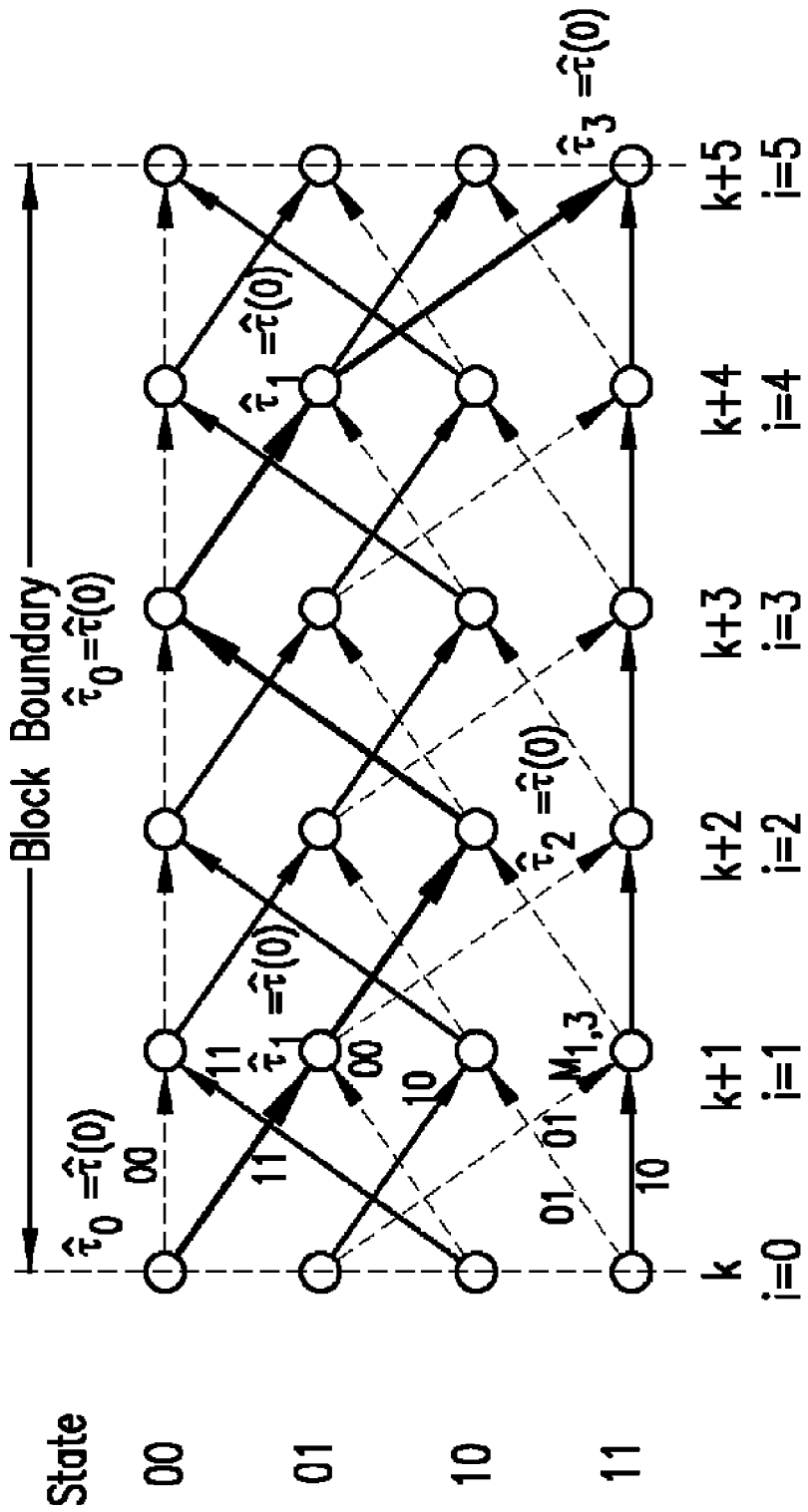
FIG. 6 is a trellis diagram that illustrates the propagation of time delay and phase estimates according to exemplary embodiments of the invention.

S2) Using the transition metrics, the Viterbi path metric is updated and the codeword symbols $\hat{m}_1(k,s_k)$ and $\hat{m}_2(k,s_k)$ are selected. Some embodiments use the transition metrics, as calculated in FIG. 5, to update the Viterbi path metric in the following manner. For a given state at a given time interval, Eqn. (13) is used to compute two transition metrics (complex numbers), which are respectively associated with the two possible incoming path segments illustrated in FIG. 4. The real component of each of these complex transition metrics is then added to its corresponding path metric to determine a resulting updated path metric associated with that particular transition. Then, the selected transition is determined to be the transition whose transition metric results in a larger updated path metric. The time delay estimate, $\hat{\tau}_{s_{k-1}}$, and the phase estimate, $\hat{\phi}_{s_{k-1}}$, associated with the selected transition are propagated to the next bit iteration. FIG. 6 shows an example of time delay propagation, which is described in more detail below.

S3) Using the selected codeword symbols and the propagated phase and time delay estimates, the early, late, and middle correlation operations are performed as defined in Eqn. (8) to Eqn. (10) of FIGS. 7-9. Propagation of time delay and phase estimates will be described with reference to the example of FIG. 6. In FIG. 6, solid lines indicate selected state transitions and the heavy solid lines indicate the selected path through the block. Considering the heavy solid line path example shown in FIG. 6, because the transition from state 00 to state 01 was chosen at time k+1, the time delay estimate for state 00, $\hat{\tau}(0)$, is propagated to state 01 and used as $\hat{\tau}$ in the correlator calculations for state 01 at time k+1. Then, because the 01-to-10 transition was chosen at time k+2, $\hat{\tau}(0)$ propagates on for use as $\hat{\tau}$ in the correlator calculations for state 10 at time k+2. The phase estimates $\hat{\phi}$ are also propagated in this fashion.

S4) Steps S1-S3 above continue to repeat until the end of the block occurs at interval k+L. At this point in time, the integrators in Eqn. (8) to Eqn. (10) are dumped and the results are fed to a delay computer and a phase detector which are followed by loop filters to produce updated phase and time estimates for use with the next block of 2*L symbols.

It should be noted that the above-described propagated time delay and phase estimates are also used in step S1 above for the calculation of transition metrics using Eqn. (13).

Figure 11:
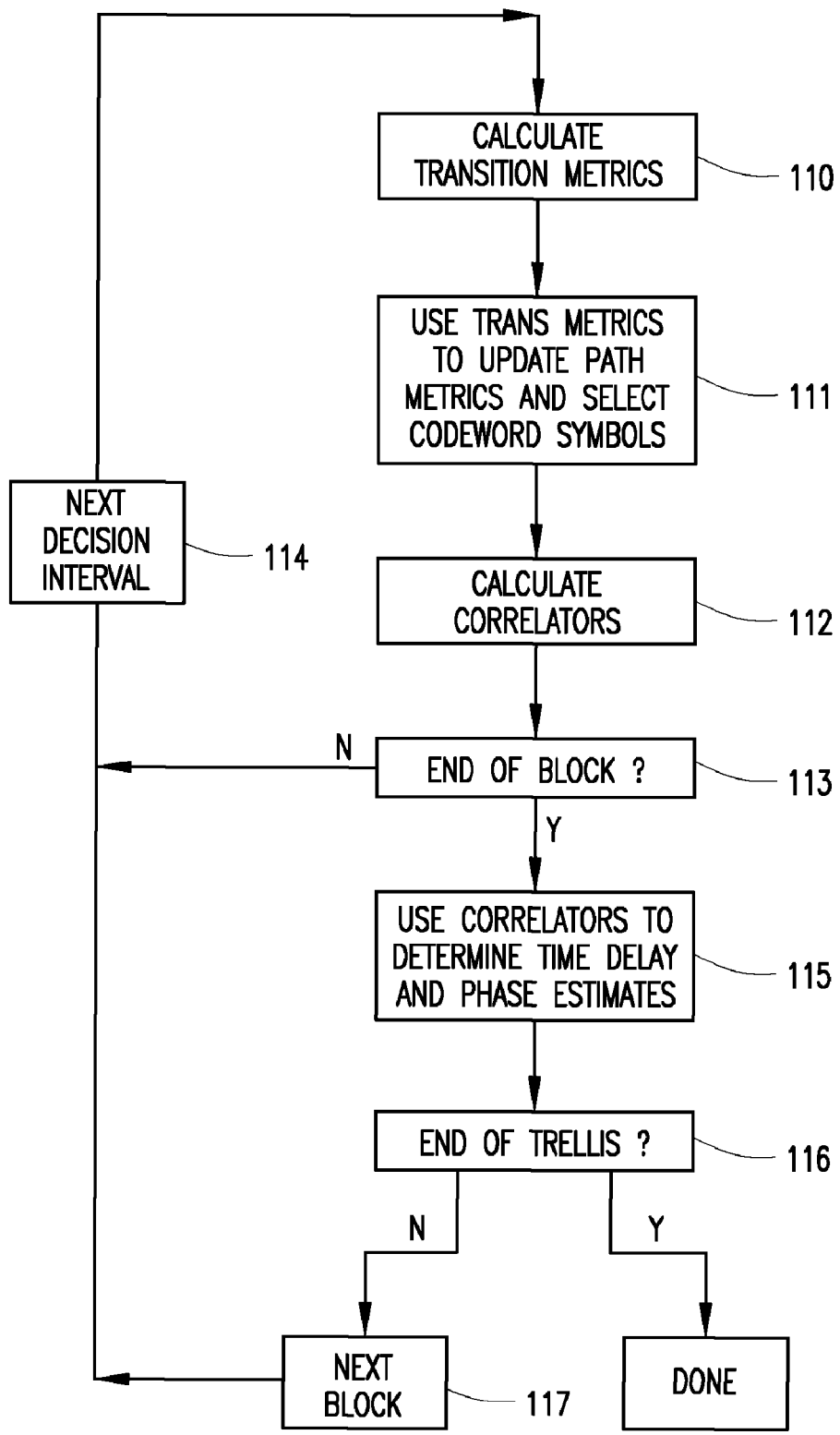
FIG. 11 illustrates exemplary operations that can be performed according to the invention.

FIG. 11 illustrates some of the exemplary operations described above. At 110, the transition metrics are calculated, and these transition metrics are used at 111 to update the Viterbi path metrics and select the codeword symbols. At 112, the updated path metrics and selected codeword symbols are used to calculate the early, middle and late correlators. As illustrated at 113 and 114, the operations at 110-112 are repeated at each successive decision interval in the trellis, until the end of the current block is identified at 113. Thereafter at 115, the correlators calculated at 112 are used to determine updated time delay and phase estimates for use with the next block. As shown at 116 and 117, the operations at 110-115 are repeated for each successive block of trellis decision intervals until the end of the trellis is reached at 116.

Figure 12:
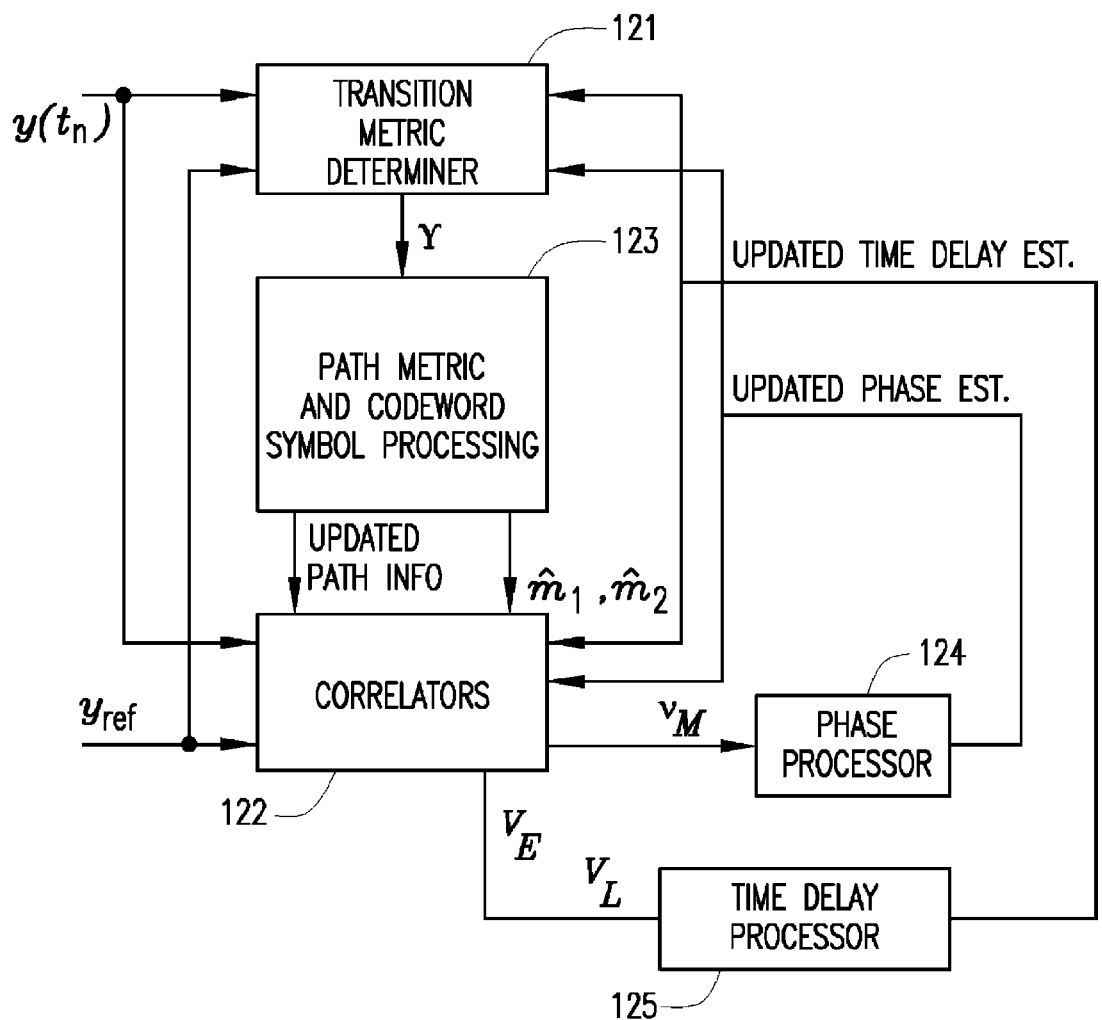
FIG. 12 diagrammatically illustrates pertinent portions of a digital communications receiver architecture that employs techniques used by exemplary embodiments of the invention.

FIG. 12 diagrammatically illustrates pertinent portions of a digital communications receiver architecture that employs techniques used by exemplary embodiments of the invention. In the example of FIG. 12, the received signal y(t) and the reference spreading function $y_{ref}$ are input to a transition metric determiner 121 and also to the early, middle and late correlators 122. The transition metric determiner 121 uses, for example, Eqn. (13) to produce the transition metrics for input to a path metric and codeword symbol processing unit 123. The unit 123 uses the transition metrics received from transition metric determiner 121 to update the Viterbi path metrics and select the codeword symbols. The unit 123 provides the updated path information and the selected codeword symbols to the correlators 122, which in turn calculate the early, middle and late correlators using, for example, Eqns. (8)-(10).

The middle correlator is provided to a phase processor 124, and the early and late correlators are provided to a time delay processor 125. The phase processor 124 produces the updated phase shift estimate in response to the middle correlator, for example, by plugging the middle correlator into Eqn. (11) of FIG. 10, and processing the result in a loop filter. The updated phase estimate is fed back to the correlators 122 and the transition metric determiner 121 for use in Eqns. (8)-(10) and (13). Respective updated phase estimates are provided for each of the respective states of the Viterbi trellis.

The time delay processor 125 produces an updated time delay estimate in response to the early and late correlators. In one exemplary embodiment, the time delay processor 125 compares the real component of the early correlator to the real component of the late correlator. If the real component of the early correlator is greater than the real component of the late correlator, then the current time delay estimate is increased by one reference sample to produce the updated time delay estimate. Otherwise, the current time delay estimate is decreased by one reference sample to produce the updated time delay estimate. The time delay processor 125 produces respective updated time delay estimates for each of the respective states of the Viterbi trellis, and these updated time delay estimates are fed back to the correlators 122 and the transition metric determiner 121 for use in Eqns. (8)-(10) and (13).

The correlators 122 and the transition metric determiner 121 utilize the updated time delay and phase estimates in Eqns. (8)-(10) and (13) during the processing of the next block of Viterbi trellis decisions.

It can be seen from the foregoing that the transition metric determiner 121 and the path metric and codeword symbol processing unit 123 can function as a decoder for performing Viterbi decoding operations according to the invention. It can also be seen that the architecture of FIG. 12 can, if desired, support integration of the despreading operation into the decoding operation. The early and late correlators, together with the time delay processor 125, function as a time delay estimator, and the middle correlator and phase processor 124 function as a phase estimator.

At the end of the trellis, as with the conventional Viterbi Algorithm, each surviving path has an associated path metric, and the ML (maximum likelihood) path is the one of the surviving paths with the largest path metric. Also, in Turbo decoding embodiments such as in FIG. 13, a soft output in the form of the a posteriori LLR, L(u(k)|y), is needed for each decoded bit. To calculate L(u(k)|y), the normal trace-back operation for the conventional Soft-Output Viterbi Algorithm (SOVA) can be used.

Continuing with the Turbo decoder of FIG. 13, the output from the IVA decoder is fed to the input of the SOVA decoder 132. The input signal, therefore, needs to be despread prior to being used by the SOVA decoder 132. The IVA decoder provides the set of despread symbols that feed the decoder 132. Note in FIG. 13 that the systematic symbols are interleaved before presentation to the SOVA decoder 132, in order to agree with the bit order that was encoded at the transmitter (see also FIG. 1). The output of the decoder 132 includes the extrinsic information, $L_e(u(k))$, the a posteriori LLR L(u(k)|y), and symbols estimates, P* associated with the second component code (see code 2 of FIG. 1).

The parity symbols, P*, shown in FIG. 13, are created in the SOVA decoder 132 and are used in the DPLL section of the IVA decoder. These parity symbols are used to increase the effective SNR at the DPLL correlators' outputs. To illustrate their use, consider Eqn. (8), Eqn. (9), and Eqn. (10) above for a rate ½ punctured Turbo code. In each equation, the first term is a summation of systematic bits and the second term is a summation over the parity bits. For a rate ½ Turbo code the parity bits are alternately from encoder 1 and the encoder 2 (see also FIG. 1). The symbol estimates for the parity bits must be taken alternately from the two decoders of FIG. 13. The parity symbol estimates, P* are used by the IVA decoder as $\hat{m}_2(k, s_k)$ in Eqns. (8), (9) and (10). This accounts for the parity symbol modulation at the transmitter (FIG. 1) and allows for integration over all of $y(t_n)$ in Eqn. (8), Eqn. (9), and Eqn. (10). This further improves the effective SNR of the correlator outputs. In the transition metric computation of Eqn. (13) for the rate ½ (punctured) code, however, the input signal $y(t_n)$ corresponding to parity symbols produced by the Code 2 component encoder (see FIG. 1) is still set to zero for every other bit.

The extrinsic information from the decoder 132 is deinterleaved and fed to the IVA decoder. Only the decoder 132 works with interleaved data. As with the standard Turbo algorithm, the IVA decoder now decodes the same input using the extrinsic information from the decoder 132 to improve the decoding process. The process is repeated until the Turbo decoder operation is complete.

Considering again the multi-channel wireless communications system shown in FIG. 15 and described above, the signal received via a given (jth) antenna has the following general form $$y^j(t_n) = \sqrt{\frac{E_s}{T_s}} c_i(k, t_n - \tau(t_n)) m(k) e^{j\varphi(t_n)} e^{j\varphi^{j,1}(t_n)} e^{j\varphi^{j,2}(t_n)} + n^{j,1}(t_n) + n^{j,2}(t_n) \quad (14)$$

where j indicates the particular channel, $E_s$ denotes the constant signal energy, $c_i(k,t)$ is a bipolar spreading function of time t for the $k^{th}$ data bit, $T_s$ is the data symbol interval, m(k) is the sequence of data symbols from the channel encoder output and for BPSK modulation takes on values of ±1, $\tau(t_n)$ is an unknown time-varying time delay, $\phi(t_n)$ is an unknown time-varying carrier phase, $\phi^{j,1}(t_n)$ is the time varying phase between the transmitter and transponder, $\phi^{j,2}(t_n)$ is the time varying phase between the transponder and ground station, $n^{j,1}(t_n)$ is modeled as zero mean complex Gaussian noise with variance $(\sigma_n^{j,1})^2 = 2N_0^{j,1}/T_{ad}$ where $T_{ad}$ is the A/D sample interval, and $n^{j,2}(t_n)$ is modeled as zero mean complex Gaussian noise with variance $(\sigma_n^{j,2})^2 = 2N_0^{j,2}/T_{ad}$.

Figure 16:
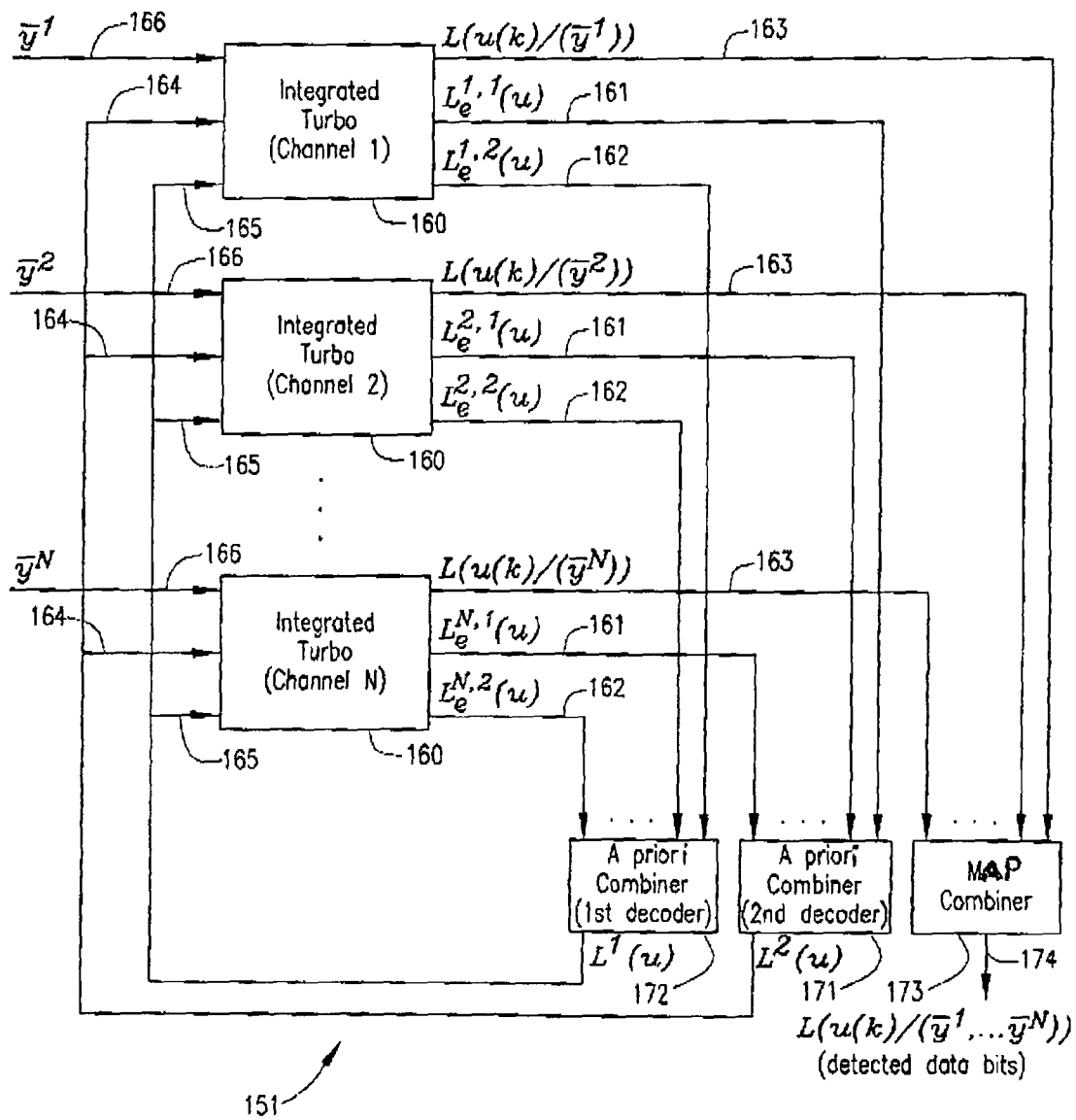
FIG. 16 diagrammatically illustrates a part of the FIG. 15 system in more detail according to exemplary embodiments of the invention.

FIG. 16 diagrammatically illustrates exemplary embodiments of an apparatus such as shown generally at 151 in FIG. 15. In the embodiments of FIG. 16, the apparatus 151 is implemented by N integrated Turbo decoders 160. Thus, for the architecture explicitly shown in the example of FIG. 15, N would have a value of 2. The integrated Turbo decoders 160 are described in more detail hereinbelow with respect to FIG. 17.

Conventional Turbo decoders use the Maximum A-Posteriori (MAP) estimator to estimate the transmitted user bits u(k). The MAP estimator gives, for each decoded bit u(k), the probability that the bit was a 1 or 0 conditioned on the received signal sequence $\bar{y}$. The output of the normal Turbo decoder is the Log-Likelihood Ratio (LLR) and has the following form $$L(u(k)/\bar{y}) = \ln\left(\frac{P(u(k) = 1/\bar{y})}{P(u(k) = 0/\bar{y})}\right) \quad (15)$$

Now, consider the case (illustrated by FIG. 15) when there are multiple received sequences, $\bar{y}^j$, for a single sequence of information bits u(k). Using Equation (15) above and assuming, for example, a SIMO system with N channels, the Log-Likelihood Ratio is $$L(u(k)/\bar{y}^1, \ldots, \bar{y}^N) = \ln\left(\frac{P(u(k) = 1/\bar{y}^1, \ldots, \bar{y}^N)}{P(u(k) = 0/\bar{y}^1, \ldots, \bar{y}^N)}\right) \quad (16)$$

In FIG. 16 (and FIG. 17), the LLR output 163 for each individual integrated Turbo decoder 160 is given by Equation (15). That is, the integrated Turbo decoders 160 respectively correspond to the N channels of the SIMO system. Bayes' Rule can be used to determine how the N LLR outputs from the individual integrated Turbo decoders 160 can be combined to compute the SIMO system LLR defined by Equation (16). Applying Bayes' Rule to Equation (16), the LLR for the SIMO system is given as $$L(u(k)/\bar{y}^1, \ldots, \bar{y}^N) = \ln\left(\frac{P(\bar{y}^1, \ldots, \bar{y}^N/u(k) = 1)P(u(k) = 1)}{P(\bar{y}^1, \ldots, \bar{y}^N/u(k) = 0)P(u(k) = 0)}\right) \quad (17)$$

Assuming the channel noise is independent, $$L(u(k)/\bar{y}^1, \ldots, \bar{y}^N) = \ln\left(\frac{\begin{array}{c}P(\bar{y}^1/u(k) = 1)P(\bar{y}^2/u(k) = 1)\ldots \\ P(\bar{y}^N/u(k) = 1)P(u(k) = 1)\end{array}}{\begin{array}{c}P(\bar{y}^1/u(k) = 0)P(\bar{y}^2/u(k) = 0)\ldots \\ P(\bar{y}^N/u(k) = 0)P(u(k) = 0)\end{array}}\right) \quad (18)$$

Also, applying Bayes' Rule to Equation (15), the output of a single-channel MAP decoder can be expressed as $$L(u(k)/\bar{y}) = \ln\left(\frac{P(\bar{y}/u(k) = 1)P(u(k) = 1)}{P(\bar{y}/u(k) = 0)P(u(k) = 0)}\right) \quad (19)$$

$$= \ln\left(\frac{P(u(k) = 1)P(y(k)/u(k) = 1)P(\bar{y}/u(k) = 1;}{\text{except}\{y(k)/u(k) = 1\}\})}{P(u(k) = 0)P(y(k)/u(k) = 0)P(\bar{y}/u(k) = 0;}{\text{except}\{y(k)/u(k) = 0\}\})}\right)$$

$$= L(u) + L_c + L_e$$

where $L_e$ is the extrinsic information, $L_c$ is the channel information, and $L(u)$ is the a-priori information. Equation (19) expresses the LLR in a form that is commonly associated with conventional Turbo decoders.

Now, Equation (19) can be used to consider combining two LLR outputs respectively associated with two different channels, that is $$L(u(k)/\bar{y}^1) + L(u(k)/\bar{y}^2) = L_e^1 + L_c^1 + L^1(u) + L_e^2 + L_c^2 + L^2(u) \quad (20)$$

Assuming that the a-priori probabilities are the same for both channels, then the following relationship can be obtained by relating Equation (20) to Equation (18)

$$L(u(k)/\bar{y}^2) = L(u(k)/\bar{y}^1) + L(u(k)/\bar{y}^2) + L(u). \quad (21)$$

In general, for N channels, the multichannel LLR can be expressed as $$L(u(k)/\bar{y}^1 \ldots \bar{y}^N) = L(u(k)/\bar{y}^1) + \ldots + L(u(k)\bar{y}^N) - (N-1)L(u) \quad (22)$$

Equation (22) above shows how the LLR outputs 163 from the individual integrated Turbo decoders 160 can be combined to produce the multichannel MAP LLR. This operation is performed by the MAP combining logic 173 shown in FIG. 16.

Figure 17:
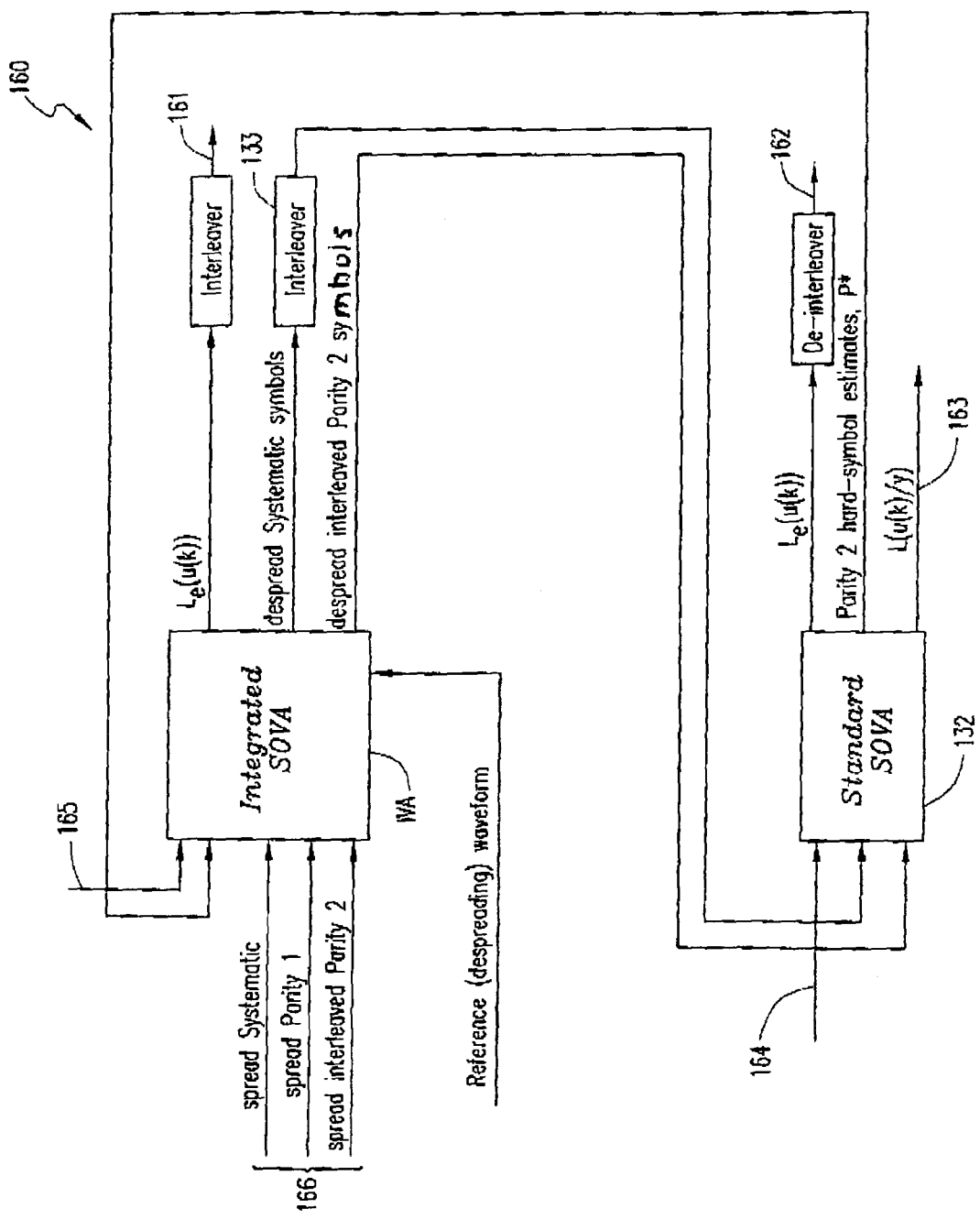
FIG. 17 diagrammatically illustrates the integrated Turbo decoders of FIG. 16 in more detail according to exemplary embodiments of the invention.

FIG. 17 diagramattically illustrates in more detail the integrated Turbo decoders 160 according to exemplary embodiments of the invention. The integrated Turbo decoder 160 of FIG. 17 is generally similar to that of FIG. 13, except the extrinsic information at 161 and 162 is not directly used as the a-priori information for the other component decoder. Rather, the extrinsic information is used for further processing as shown in FIG. 16. In particular, as shown in FIG. 16, the extrinsic information outputs 161 from the first component decoders (corresponding to IVA in FIG. 17) of the N channels are fed into a corresponding a-priori combiner 171, and the extrinsic information outputs 162 from the second component decoders (corresponding to 132 in FIG. 17) of the N channels are fed into a corresponding a-priori combiner 172. Combining logic at 171 produces a-priori information for use by the second component decoders of the N channels, and combining logic at 172 produces a-priori information for use by the first component decoders of the N channels. This is possible because, during the iterative Turbo decoding process, the decoder logic at IVA and the decoder logic at 132 operate in parallel with one another.

For example, and with continued reference to FIGS. 16 and 17, the input signal $\bar{y}^j(j=1, 2, \ldots N)$ for each channel is fed at 166 to the Integrated SOVA decoder IVA for that channel. This is the first component decoder for the channel. The first component decoders IVA of the N channels operate in parallel with one another. The extrinsic information outputs 161 from each of the first component decoders IVA are fed to the a-priori combiner 171. The a-priori information $L^2(u)$ output produced by the a-priori combiner 171 is fed to the input 164 of the second component decoder of each of the N channels. The second component decoders 132 of the N channels also operate in parallel with one another, and their extrinsic information outputs 162 are fed to the a-priori combiner 172. The a-priori information $L^1(u)$ output from the a-priori combiner 172 is fed to the input 165 of the first component decoder of each of the N channels. The iterative process continues until the Turbo decoding is terminated.

As described above, the a-priori combiner 171 receives extrinsic information from the first component decoders IVA, and the a-priori combiner 172 receives extrinsic information from the second component decoders 132. This extrinsic information is defined by probability values that can be normalized by the combiners 171 and 172 to produce an a priori probability as follows $$L(u(k)) = \ln\left(\frac{P(u^1(k)=1) + \ldots + P(u^N(k)=1)}{P(u^1(k)=0) + \ldots + P(u^N(k)=0)}\right) \quad (23)$$

Using the relationships shown by Equations (24)-(26) below, Equation (23) above can be rewritten as shown in Equation (27) below:

$$L(u(k)) = \ln\left(\frac{P(u(k)=1)}{P(u(k)=0)}\right) \quad (24)$$

$$P(u=1) = \frac{e^{L(u(k))}}{1+e^{L(u(k))}} \quad (25)$$

$$P(u=0) = 1 - \frac{e^{L(u(k))}}{1+e^{L(u(k))}} \quad (26)$$

$$L(u(k)) = \ln\left(\frac{\frac{e^{L(e^1(k))}}{1+e^{L(e^1(k))}} + \ldots + \frac{e^{L(u^N(k))}}{1+e^{L(u^N(k))}}}{N - \left(\frac{e^{L(u^1(k))}}{1+e^{L(u^1(k))}} + \ldots + \frac{e^{L(u^N(k))}}{1+e^{L(u^N(k))}}\right)}\right) \quad (27)$$

The a-priori combiner 171 applies equation (27) to the extrinsic information outputs 161 from the first component decoders (IVA) of the N channels, and thereby computes the a-priori information output $L^2(u)$ to be used by the second component decoders 132 of the N channels for the next iteration of the decoding process. Similarly, the a-priori combiner 172 applies equation (27) to the extrinsic information outputs 162 from the second component decoders 132 of the N channels, and thereby computes the a-priori information output $L^1(u)$ to be used by the first component decoders IVA of the N channels for the next iteration of the decoding process.

Once the integrated Turbo decoding process is completed by the apparatus of FIG. 17, the MAP combiner 173 receives the LLR output 163 from each of the N channels, and implements Equation (27) with respect to the LLR outputs 163 to compute the estimated information bits, shown at 174.

Figure 18:
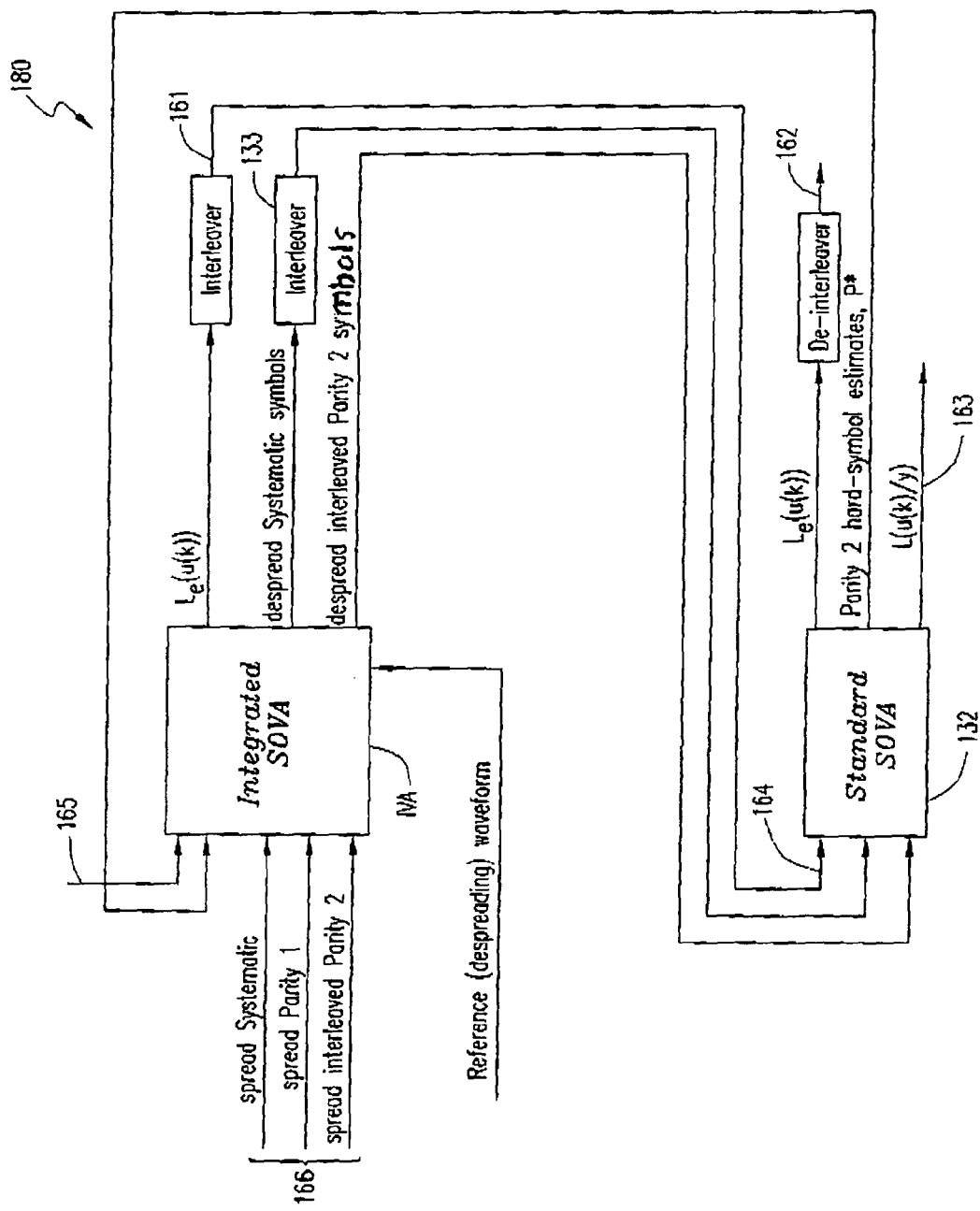
FIG. 18 diagrammatically illustrates an integrated Turbo decoder according to further exemplary embodiments of the invention.

Some embodiments use an integrated Turbo decoder configuration wherein the component decoder pairs operate in serial fashion. The extrinsic information produced by an iteration of the integrated Turbo decoder is provided as the a-priori information to the next integrated Turbo decoder in a serially coupled chain of integrated Turbo decoders. Some embodiments according to the aforementioned serial configuration use an integrated Turbo decoder 180 that is configured as illustrated diagrammatically in FIG. 18. The integrated Turbo decoder 180 of FIG. 18 is similar to the integrated Turbo decoder 160 of FIG. 17, but the extrinsic information produced at 161 by the decoder component ITA is provided as a priori input to the decoder component 132, as shown at 164. The extrinsic information 162 from the decoder component 132 is available to be fed to the next integrated Turbo decoder 180 in a serial chain arrangement (shown in FIG. 19 and described below).

Figure 19:
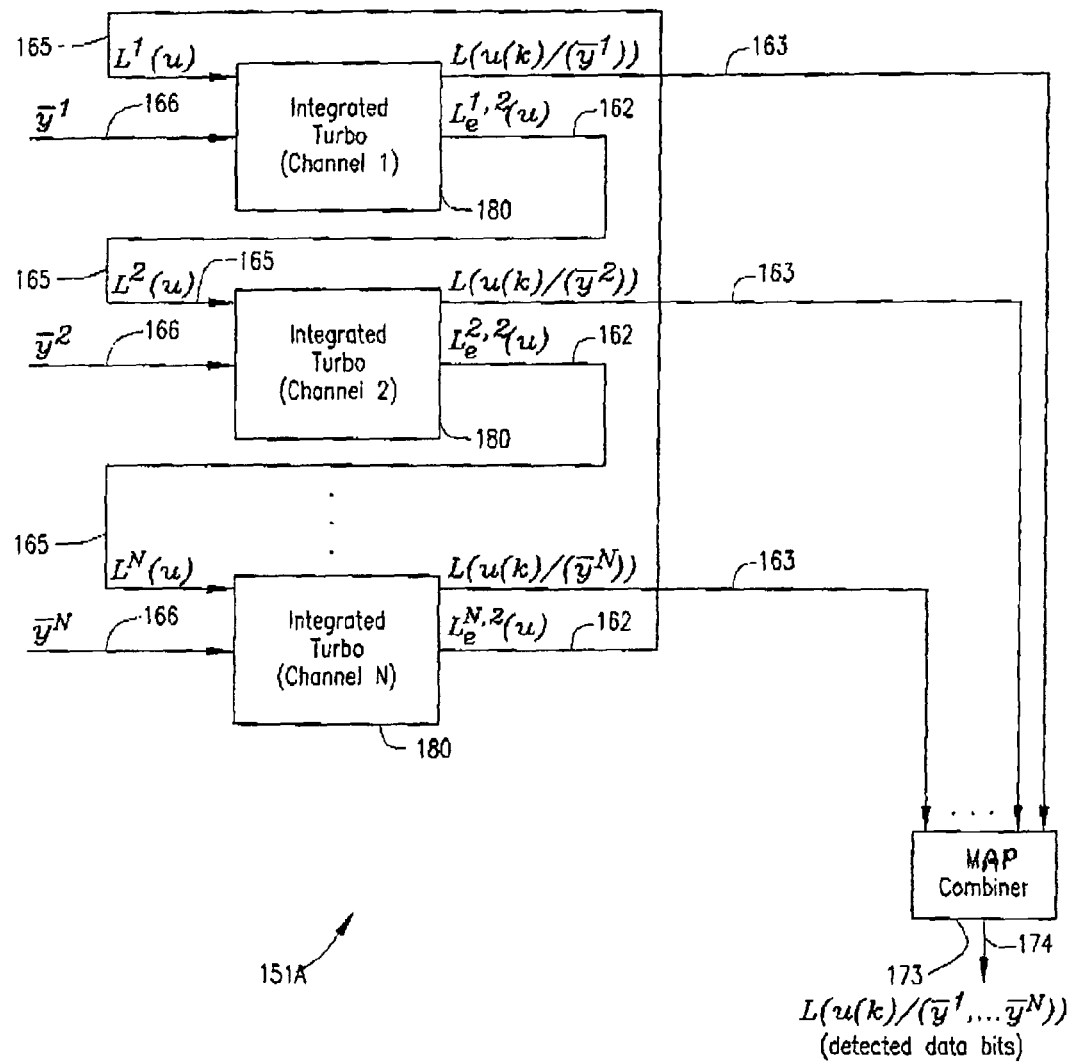
FIG. 19 diagrammatically illustrates a part of the FIG. 15 system in more detail according to further exemplary embodiments of the invention.

FIG. 19 diagrammatically illustrates exemplary embodiments of an apparatus such as shown generally at 151 in FIG. 15. In the embodiments of FIG. 19, the apparatus 151A includes the aforementioned serial chain configuration of iterated Turbo decoders 180, in particular N decoders 180 that respectively correspond to N transmission channels. In some embodiments, the apparatus 151A operates as follows.

Referring to FIGS. 18 and 19, the decoding starts with the integrated Turbo decoder 180 for channel 1. With its a-priori information initially set to all zeros, the channel 1 decoder 180 operates on the incoming sampled data for channel 1, $\bar{y}^1$, completes a single iteration of the Integrated Turbo Algorithm, and then stops. The extrinsic information 162 produced by the channel 1 decoder 180 is provided as a priori input for the first decoder component IVA of the channel 2 decoder 180 (at 165). The channel 2 decoder 180 then operates on its associated channel data, $\bar{y}^2$, completes a single iteration of the Integrated Turbo Algorithm, and its extrinsic information, produced at 162, is provided as a priori input for the first decoder component IVA of the channel 3 decoder 180 (at 165). This process continues sequentially along the chain of decoders in FIG. 19, until the channel N decoder 180 finally completes a single iteration of the Integrated Turbo Algorithm, and provides its extrinsic information 162 to the channel 1 decoder 180 (at 165). At this point, one full iteration of serial multi-channel processing has been completed.

The above-described serial multi-channel processing operations can be repeated for as many full iterations as desired. The larger the number of full iterations implemented, the better the overall performance of the apparatus 151A. Various exemplary embodiments use various numbers of full iterations, for example, in a range from five to ten. After the desired number of full iterations has been completed, the outputs 163 of each of the N decoders are fed to MAP combiner 173, which implements Equation (27) to produce the estimated information bits at 174, in the same manner described above with respect to FIG. 16.

Although exemplary embodiments of the invention have been described above in detail, this does not limit the scope of the invention, which can be practiced in a variety of embodiments.

What is claimed is:

1. An apparatus for decoding a digital communication signal, comprising:
   an input for receiving said digital communication signal via a plurality of communication channels, wherein all communication information carried by said digital communication signal is associated with a single user;
   a decoder connected to said input to receive said digital communication signal and configured to produce sets of symbol estimates in response to said digital communication signal; and
   a parameter estimator connected to said input to receive said digital communication signal and configured to produce, in response to said digital communication signal, parameter estimates of one of a time delay parameter and a phase parameter associated with transmission of said digital communication signal said parameter estimator also connected to said decoder and further configured to produce at least some of said parameter estimates based respectively on at least some of said sets of symbol estimates.

2. The apparatus of claim 1, wherein said decoder is further configured to produce at least some of said sets of symbol estimates based respectively on at least some of said parameter estimates.

3. The apparatus of claim 2, wherein said decoder implements a convolutional decoding operation.

4. The apparatus of claim 3, wherein said decoder implements a Viterbi trellis.

5. The apparatus of claim 2, wherein the apparatus is part of a Turbo decoding apparatus.

6. The apparatus of claim 1, wherein said parameter estimator is configured to produce parameter estimates of both said time delay parameter and said phase parameter.

7. A method of decoding a digital communication signal, comprising:
   receiving said digital communication signal at a communication receiver via a plurality of communication channels, wherein all communication information carried by said digital communication signal is associated with a single user;
   inputting said digital communication signal in parallel to first and second processing paths in the communication receiver;
   producing by the first processing path, in response to said digital communication signal, sets of symbol estimates; and
   producing by the second processing path, concurrently with said producing by the first processing path, and in response to said digital communication signal, parameter estimates of one of a time delay parameter and a phase parameter associated with transmission of said digital communication signal, said parameter estimates producing including producing at least some of said parameter estimates based respectively on at least some of said sets of symbol estimates.

8. The method of claim 7, wherein said producing sets of symbol estimates includes producing at least some of said sets of symbol estimates based respectively on at least some of said parameter estimates.

9. The method of claim 8, wherein said producing by the first processing path includes implementing a convolutional decoding operation.

10. The method of claim 9, wherein said producing by the first processing path includes implementing a Viterbi trellis.

11. The method of claim 7, wherein said producing by the second processing path includes producing parameter estimates of both said time delay parameter and said phase parameter.

* * * * *